Nov. 29, 1949  W. J. BUFORD  2,489,856
CRAB TRAP
Filed Dec. 12, 1946
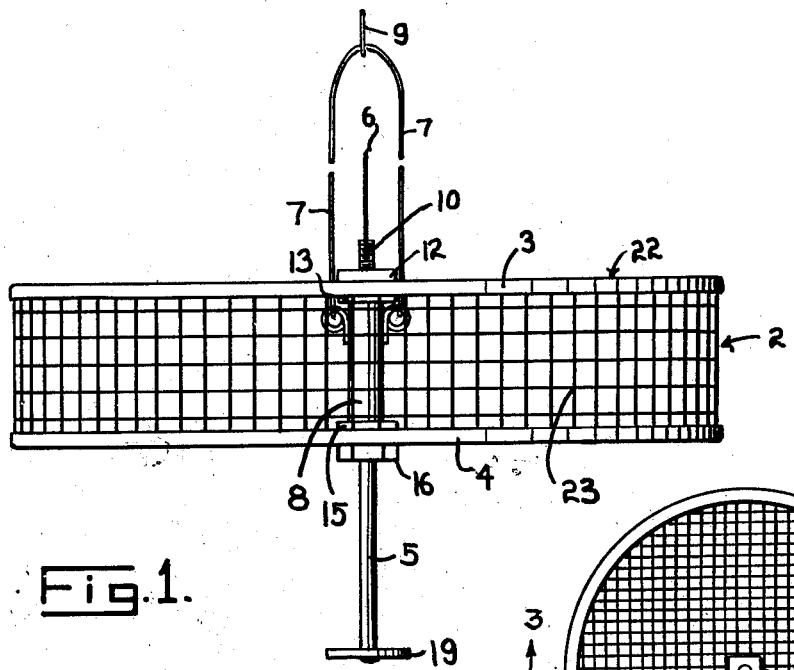
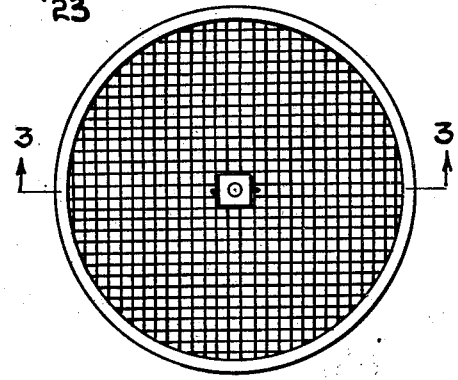
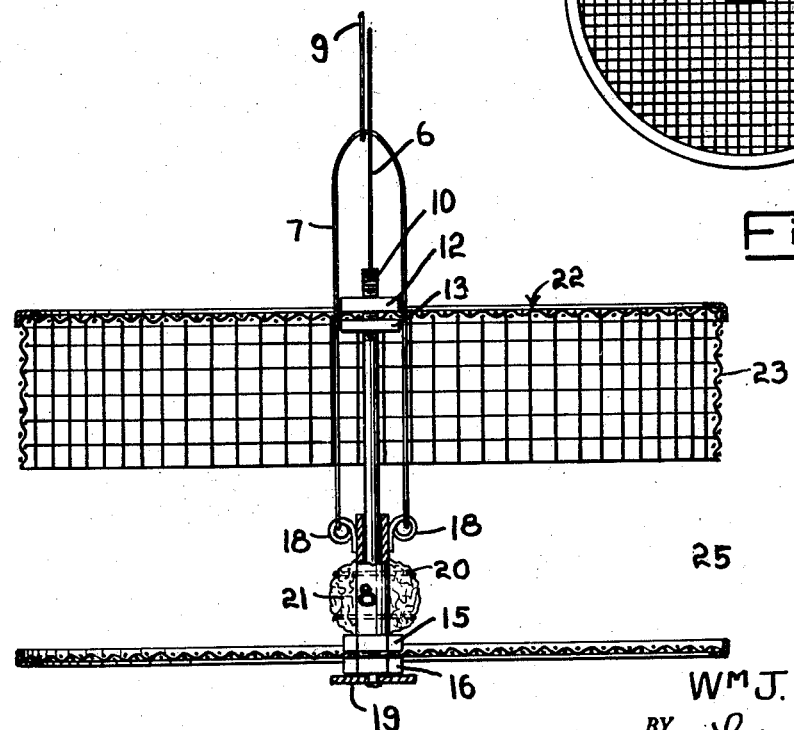
INVENTOR.
W<sup>m</sup> J. BUFORD
BY Lester B. Clark
  Ray L. Smith
  ATTORNEYS Patented Nov. 29, 1949

2,489,856

UNITED STATES PATENT OFFICE 2,489,856

CRAB TRAP

William J. Buford, Houston, Tex.

Application December 12, 1946, Serial No. 715,811

1 Claim. (Cl. 43—102)

The invention relates to a trap and in particular to a trap adapted for catching crabs or the like.

An object of the invention is to provide a trap adapted to be lowered into a body of water and which is then operable to opened or closed position.

Another object of the invention is to provide a crab trap comprising a housing with an open side therein to provide access to the trap.

Another object of the invention is to provide a trap comprising an open ended container with a portion thereof normally retained in spaced relation from the container but adapted to slidably move into engagement with the rest of the container to form a completed enclosure.

A further object of the invention is to provide a trap including a housing with an opening therethrough, a shaft connected to the housing and extending through the opening with a closure member slidably mounted on such shaft and operable to engage the housing structure in such a manner so as to close the opening thereby forming a closed container.

Other and further objects and advantages will be more fully apparent with a consideration of the following description and drawings wherein:

Fig. 1 is an elevation of the trap showing the closure member in engagement with the open sided container thereby forming a closed container.

Fig. 2 is a top plan view of the trap.

Fig. 3 is a sectional view on the line 3—3 of Fig. 2 showing the trap in open position.

In Fig. 1, the trap shown at 2 comprises an open sided housing 3 with a cooperating bottom platform or closure member 4. A shaft or central supporting member 5 extending longitudinally of the trap forms the support means for the housing or cage member 3 and the closure member 4 is slidably mounted thereon.

The trap is lowered to the desired elevation in a body of water by means of a cord 6 connected into the upper part of the shaft 5. A pull member 7 is connected to a sleeve 8 which is in turn connected to the closure member 4, so that the operator of the trap may, by pulling on the cord 9 and the pull member 7, lift the closure 4 up into engagement with the housing 3, thereby forming a closed container. The weight of the closure member 4 will normally cause it to drop to open position spaced from the housing as seen in Fig. 3, so that the crabs, or the like, may have access to the interior thereof.

The shaft 5 is provided with a threaded area 10 on its upper portion so that the housing 3 may be secured in place on the shaft by a nut 13 thereon and immediately above the housing 3 a nut 12 is positioned against the immediate opposite side of the housing to firmly affix the parts together.

The closure member 4 is positioned on the sleeve 8 by nuts 15 and 16 similarly disposed on each side of the member so as to pin it therebetween. The sleeve 8 is of suitable diameter so that it fits the shaft 5 in sliding engagement. The eye hooks or other means 18 connected to the outer periphery of the sleeve 8 are arranged to receive the pull cables 7 which extend upwardly through the housing 3. The stop 19 on the lower end of shaft 5 provides a rest for the member 4. Suitable bait hooks 20 are provided on the sleeve 8 to receive the bait 21.

The housing 3 is shown as comprising an open wire top 22 with downwardly extending open wire sides 23. While the housing has been shown as a cylinder, it is not intended that the invention be limited to this since it would be possible to vary the shape and design of the trap so long as the members 3 and 4 cooperate to form a container. Any type covering may be used for the trap, but it has been found that the most advantageous is a foraminous material, such as screen. In operation, the trap is lowered to a desired elevation in a body of water by the cable 6. The cord 9 is released to allow the closure 4 and the pull members 7 to drop down onto the stop 19. This arrangement allows crabs and other fish access through the gap 25 between the members so as to reach the bait 21.

When the operator has determined that the bait has been attacked by crabs, and that the crabs are probably on the closure 4, the trap is closed by exerting a pull on the cord 9. This moves the closure member 4 up against the bottom of the housing 3 closing the trap.

Broadly the invention contemplates a crab trap which has cooperating portions thereof in spaced relation but which may be relatively movable to closed position.

What is claimed is:

A crab trap comprising a central supporting member, a platform slidably secured to the lower end thereof, a cage member having an open bottom coextensive with size and contour of the platform, said supporting member being fixedly secured to said cage, and means on opposite sides of the support for securing the platform to a cable, a cord secured to said support, said means including a member surrounding said support to retain bait adjacent said platform, whereby a lowering of the cable will permit the platform to move on downwardly relative to the cage and a pull on the cable will lift the platform to close the cage.

WILLIAM J. BUFORD.

REFERENCES CITED

The following references are of record in the file of this patent:

UNITED STATES PATENTS

| Number | Name | Date |
| --- | --- | --- |
| 79,577 | Kohler | July 7, 1868 |
| 199,987 | McGuire | Feb. 5, 1878 |
| 778,675 | Kerns | Dec. 27, 1904 |
| 937,360 | Cole | Oct. 19, 1909 |